UNITED STATES PATENT OFFICE.

CHARLES DE LA HARPE, OF BASLE, SWITZERLAND, ASSIGNOR TO FIRM OF DYE WORKS, FORMERLY L. DURAND, HUGUENIN & CO., OF BASLE, SWITZERLAND.

BLUE DYE AND PROCESS OF MAKING SAME.

SPECIFICATION forming part of Letters Patent No. 707,833, dated August 26, 1902.

Application filed February 27, 1902. Serial No. 95,994. (Specimens.)

*To all whom it may concern:*

Be it known that I, CHARLES DE LA HARPE, chemist, a citizen of the Swiss Republic, and a resident of Basle, Switzerland, have invented new and useful Improvements in the Manufacture of Blue Dyestuffs, of which the following is a full, clear, and exact description.

According to the Letters Patent No. 547,173, of October 1, 1895, and No. 616,622, of December 27, 1898, a leuco compound insoluble in an aqueous solution of sodium acetate is obtained when a gallocyanin is condensed with a phenol, such as resorcin. Letters Patent No. 531,148 informs that by condensing a gallocyanin with a phenolsulfonic acid there is obtained a leuco derivative soluble in sodium acetate, which leuco derivative can also be used in form of its product of oxidation, also soluble in sodium acetate. Finally it is known by Letters Patent No. 585,934 that it is possible to sulfonate the derivatives obtained in condensing a gallocyanin with a phenol. The derivatives thus obtained are also soluble in sodium acetate. I have now found that on condensing sulfonic gallocyanins—such as those obtained, for example, by the reaction of a nitrosoalkylbenzylanilin-sulfonic acid upon gallic acid or its derivatives with a phenol—there are also obtained leuco derivatives which are, as well as their oxidation products, soluble in sodium acetate. The introduction of a sulfo group has consequently always for effect to render the derivatives soluble in sodium acetate.

Example: Five parts of the gallocyanin obtained by the reaction of the nitrosoethylbenzylanilin-sulfonic acid upon gallamic acid are added to a solution containing two parts of resorcin, two parts of water, and fifteen parts of commercial hydrochloric acid. The mass is then heated to about 90° centigrade till complete transformation of the primitive gallocyanin, the end of which may be acknowledged on the fact that the product of reaction is then soluble with brown color in concentrated sulfuric acid, while the primitive gallocyanin dissolves therein with blue color. The mass is then poured into water, filtered, and pressed. The dyestuff thus obtained constitutes a blackish powder or paste very sparingly soluble in cold water, soluble in sodium acetate as well as in alkalies; this latter solution oxidizes itself very rapidly in the air. This coloring-matter dyes chromium mordanted fibers in pure blue shades. Eventually it may also be treated according to the indications of Letters Patent No. 616,622.

In the foregoing example the gallocyanin obtained by the reaction of the nitrosoethylbenzylanilin-sulfonic acid upon the gallamic acid may be replaced by any other sulfonic gallocyanin obtained by the action of a nitrosoalkylbenzylanilin-sulfonic acid upon gallic acid or one of its derivatives, such as gallamic acid, gallic ethers, gallanilid, &c.

What I claim is—

1. The herein-described improvement in the manufacture of blue dyestuffs, consisting in condensing a phenol with a sulfonic gallocyanin.

2. The herein-described improvement in the manufacture of blue dyestuffs, consisting in condensing a phenol with a sulfonic gallocyanin derived from a nitrosoalkylbenzylanilin-sulfonic acid.

3. The herein-described improvement in the manufacture of blue dyestuffs, consisting in condensing resorcin with a sulfonic gallocyanin derived from a nitrosoalkylbenzylanilin-sulfonic acid.

4. The herein-described improvement in the manufacture of blue dyestuffs, consisting in condensing resorcin with a sulfonic gallocyanin derived from the nitrosoethylbenzylanilin-sulfonic acid.

5. As a new article of manufacture, the herein-described blue dyestuffs obtained by the condensation of the resorcin with a gallocyanin resulting from a nitrosoalkylbenzylanilin-sulfonic acid, the said dyestuffs constituting in dry state a blackish powder very sparingly soluble in cold water, soluble in sodium acetate and alkalies and dying chromium mordanted fibers in pure blue shades.

In witness whereof I have hereunto signed my name, this 13th day of February, 1902, in the presence of two subscribing witnesses.

CHARLES DE LA HARPE.

Witnesses:
GEO. GIFFORD,
AMAND RITTER.